United States Patent [19]

Fantacci

[11] Patent Number: 5,234,171
[45] Date of Patent: Aug. 10, 1993

[54] INSTALLATION FOR CRUSHING USED VEHICLE TIRES AND THE LIKE, AND FOR SEPARATING THE METAL PARTS FROM THE NON-METAL PARTS OF THE CRUSHED MATERIAL

[75] Inventor: Tosco Fantacci, Pistoia, Italy

[73] Assignee: Cisap S.p.A., Pistoia, Italy

[21] Appl. No.: 884,007

[22] Filed: May 18, 1992

[30] Foreign Application Priority Data

May 20, 1991 [IT] Italy .............................. FI/91/A 116
Oct. 23, 1991 [IT] Italy .............................. FI91/A 254

[51] Int. Cl.$^5$ ........................................... B02C 23/14
[52] U.S. Cl. ........................................ 241/24; 241/76; 241/78; 241/DIG. 31
[58] Field of Search ............... 241/24, 76, 78, 79.1, 241/DIG. 31

[56] References Cited

U.S. PATENT DOCUMENTS

| | | | |
|---|---|---|---|
| 2,462,645 | 2/1949 | Knowland | 241/76 X |
| 2,471,043 | 5/1949 | Schenck | 241/76 X |
| 3,923,256 | 12/1975 | Dörner | 241/DIG. 31 X |
| 4,714,201 | 12/1987 | Rouse et al. | 241/DIG. 31 X |
| 4,726,530 | 2/1988 | Miller et al. | 241/DIG. 31 X |
| 4,813,614 | 3/1989 | Moore et al. | 241/DIG. 31 X |

Primary Examiner—Mark Rosenbaum
Assistant Examiner—Frances Chin
Attorney, Agent, or Firm—McGlew and Tuttle

[57] ABSTRACT

An installation for crushing vehicle tires and the like and for separating the metal parts from the nonmetal parts comprises in combination: a first crusher unit (1); a first screening assembly (27) associated with said first crusher unit (1), to divide the granules into at least two groups, depending on their size; a separation section (35) to separate the metallic material from the larger granules originating from said first screening assembly (27) and to recirculate the nonmetallic material; a second crusher unit (71) which receives the granules of smaller size originating from the first screening assembly and the granules of nonmetallic material originating from said separation section (35); and downstream from said second crusher unit, a first separator means (83) to separate the metal parts from the nonmetal parts.

8 Claims, 7 Drawing Sheets

INSTALLATION FOR CRUSHING USED VEHICLE TIRES AND THE LIKE, AND FOR SEPARATING THE METAL PARTS FROM THE NON-METAL PARTS OF THE CRUSHED MATERIAL

FIELD OF THE INVENTION

The invention relates to an installation and to a corresponding method for crushing vehicle tires and the like, and for separating the metal parts from the non-metal parts of the product obtained.

BACKGROUND OF THE INVENTION

Extremely complex installations do exist for processing used tires in order to separate the metal parts (for example the bead wires and the reinforcements) from the rubber parts or in any case from the nonmetal parts. These installations incorporate a processing line along which the used tires are crushed and subjected to a magnetic-type separation of the metal parts from the rubber. The rubber may then be graded according to the size of the granules, for the purposes of reutilizing the granular material obtained as recovered material for the production of various industrial articles, depending on the size of the granules.

Known installations which carry out these operations are particularly complex, bulky and expensive.

The subject of the invention is an installation of the abovementioned type which enables used tires to be processed and the desired separation of the metal parts from the nonmetal parts to be achieved, at comparatively very limited cost and spatial requirements in relation to equipment known to date.

SUMMARY AND OBJECTS OF THE INVENTION

Basically, according to the invention, the installation comprises in combination:

a first crusher unit fed with pieces of tire obtained for example by means of shearing machines of a known type and described in Italian Patent Application No. 9353 A/89 filed on Mar. 1, 1989 or in European Patent Application No. 91830469.2 filed on Oct. 30, 1991 (the content of which is incorporated in the present description), both of which documents are held by the same proprietor; this first unit crushes said pieces to obtain granules of reduced size;

a first screening assembly associated with said first crusher unit, to divide the granules into at least two groups, depending on their size;

a separation section to separate the metallic material from the larger granules originating from the said first screening assembly and to recirculate the non-metallic material;

a second crusher unit which receives the granules of smaller size originating from the first screening assembly and the granules of nonmetallic material originating from the separation section; and downstream from said second crusher unit, a separator means to separate the metal parts from the nonmetal parts.

Advantageously, downstream from the separator means, a second screening assembly may be arranged to divide the granules of nonmetallic material according to their size, and thereby obtain a graded, granular, non-metallic material at the outlet of the installation, to be subsequently reutilized as recovered material.

Between the first screening assembly and the separation section, a further second separator means may be arranged which receives the granules of smaller size originating from the first screening assembly so as to separate the metallic material from the nonmetallic material, and to discharge the metallic material toward the separation section and the nonmetallic material toward the second crusher means. This further second separator means ensures that the material of smaller size obtained from the first screen is divided, thus preventing the metal or predominantly metal particles from being recirculated toward the second crusher unit.

Advantageously, in a possible embodiment, the separation section may comprise a rotor means in order to separate the metallic material from the nonmetallic material in granules of greater size originating from the first screening assembly. Downstream from the rotor means is arranged a third separator means to separate the metallic material from the nonmetallic material and recirculating means which convey the latter toward the second crusher unit, so that the nonmetallic material can be divided into even finer particles.

The rotor may be of the type having radial blades or the like, rotating at high speed.

Since the metallic material employed in the construction of motor vehicle tires is usually iron, the separator means may be of the magnetic type, and in particular comprise belt and pulley systems having a magnetized pulley or partially magnetized rotating rollers. Devices of this type are known to experts in the field.

The first crusher unit may comprise counter-rotating blade means and, optionally, grinding means, which may be made up of counter-rotating rollers having parallel axes and helically arranged toothings so as to break up the granules which fall into the groove formed between the two rollers. Grinding means may also be incorporated in the second crusher unit.

The invention also relates to a method for crushing vehicle tires and the like and for separating the metal parts from the nonmetal parts, incorporating the following phases:

subjecting the material to be processed to a first crushing operation;

effecting a first screening of the crushed material;

conveying the granules of larger size originating from the first screening toward means for separating the nonmetallic material from the metallic material and for recirculating the nonmetallic material toward means for a second crushing operation;

subjecting the recirculated material and the granules of smaller size originating from the first screening assembly to a further crushing operation;

subjecting the material originating from said second crushing operation to an operation for separating out the metallic material and the nonmetallic material.

Advantageously, the nonmetallic material obtained from the separation downstream from the second crusher unit may be subjected to screening in order to grade the granules according to their size, thereby facilitating their subsequent reutilization as recovered material.

In a further possible advantageous embodiment of the method according to the invention, the granules of smaller size originating from the first crushing operation are processed in order to separate the metallic material from the nonmetallic material, thus preventing the metallic material already separated from the nonmetallic material from being recirculated.

According to a further embodiment, the installation comprises in combination: a crusher unit having a plurality of grinding stages; a first crusher which receives the material from the crusher unit; a first magnetic separator or apparatus for removing ferrous metal from the material originating from the first crusher; a further grinding stage; a second crusher; at least a second ferrous metal removing apparatus; a series of screens in a cascade arrangement for separating the granules; a suction unit having suction terminals at least from the crushers and having a trap-mechanism separator which discharges the material into microprojection oscillating separator and conveyor units, in order to reintroduce said material into the cycle and to separate the fibers; apparatuses for the recovery of the ferromagnetic metal; and conveyance means of the shakes, cup, screw, or equivalent type.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
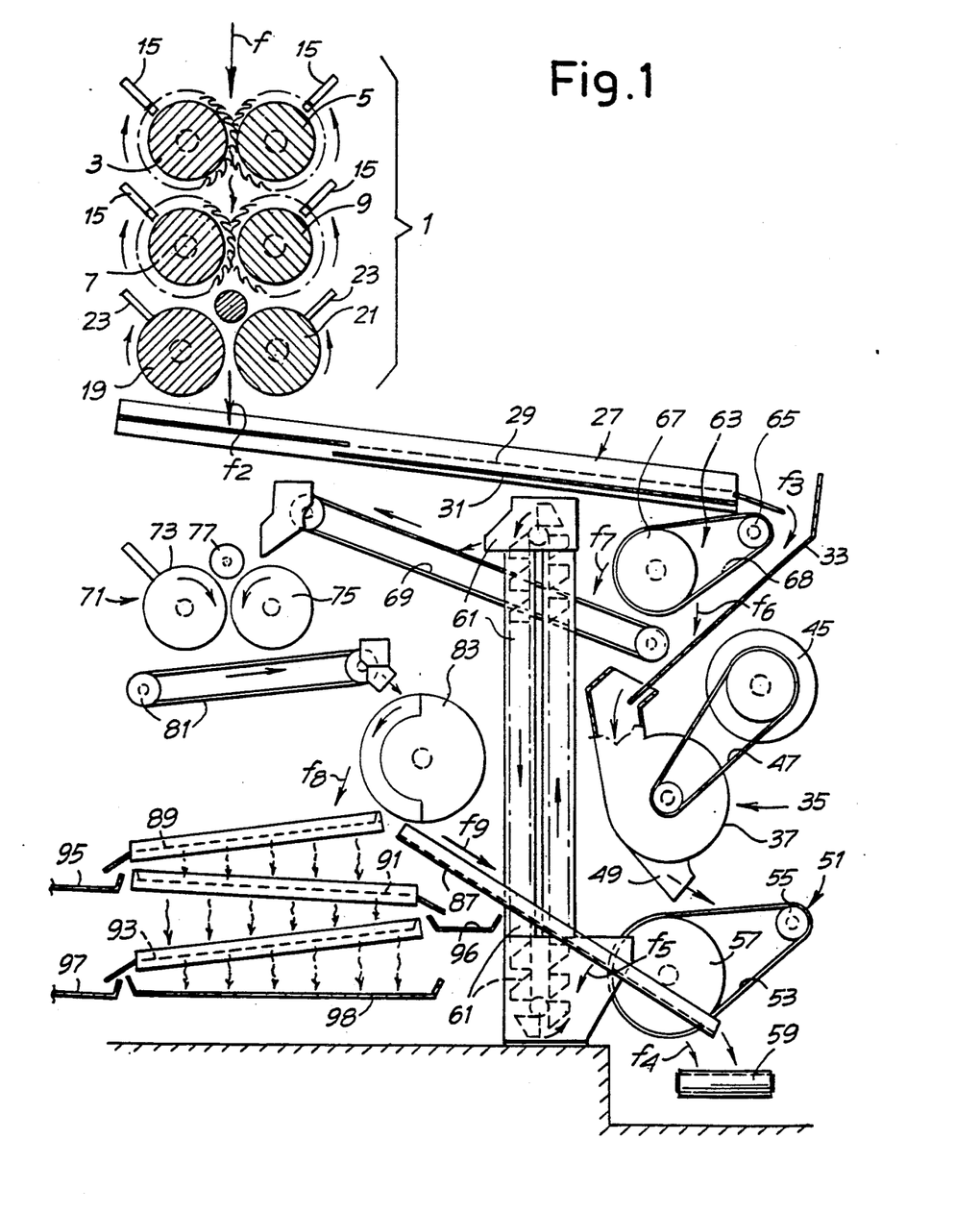
FIG. 1 shows a diagram of the installation according to the invention.
Figure 2:
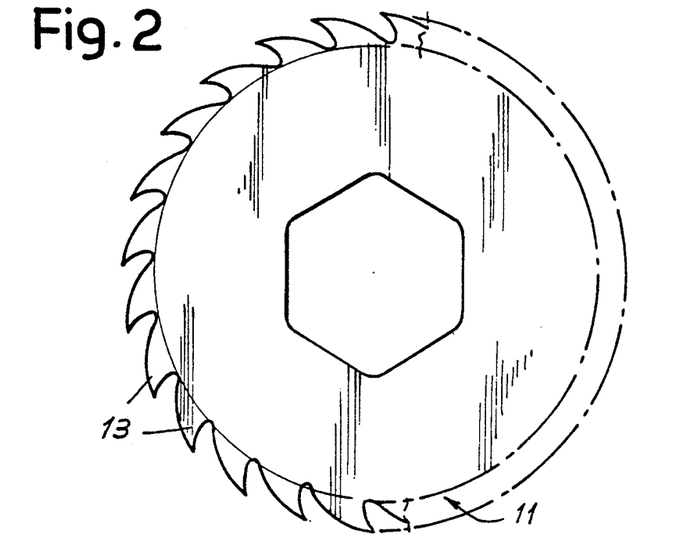
FIG. 2 shows a detail of the blades in the crushing assembly.
Figure 3:
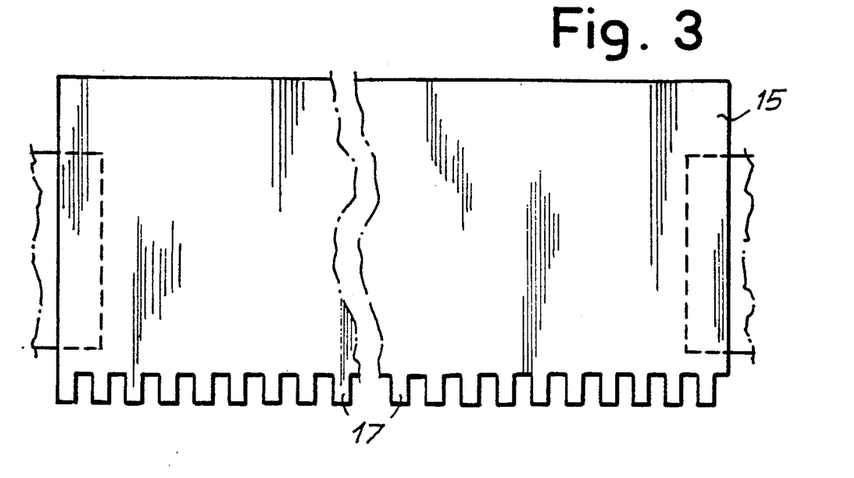
FIG. 3 shows a further detail of the crushing assembly.

The installation as a whole is diagrammatically illustrated in FIG. 1. The tire pieces sheared by shears (not shown) are fed in the direction of the arrow f to a first crusher unit, indicated as a whole by 1 and comprising a first pair of bladed rollers 3, 5 and a second pair of bladed rollers 7, 9. Each bladed roller has a plurality of toothed disks of the type indicated in FIG. 2 and designated as a whole by 11. These disks have toothings 13 oriented tangentially so as to shear and crush the product which falls into the groove between the two rollers 3, 5 and 7, 9 respectively. The teeth of the rollers 7, 9 are smaller in size than the teeth of the rollers 3, 5, in order that, from the first to the second pair of rollers, a finer crushing is obtained. Associated with each of the rollers 3, 5, 7 and 9 are cones 15 which delimit the area into which the material falls, shaped (as diagrammatically indicated in FIG. 3) by a series of teeth 17 which penetrate between adjoining disks 11. The first crusher unit 1 additionally comprises a pair of grinding rolls 21, with which are associated cones 23 similar to the cones 15, and which are fitted with helically oriented toothings in such a way that the material falling into the groove formed between the rolls 19, 21 is subjected to forces of opposite directions on the part of the toothings of the respective rolls. At the inlet of the groove between the assemblies 19 and 21 is arranged a cylinder 25 which increases the points of contact between the material and the grinding rolls 19, 21, thereby improving the efficiency of the grinding assembly. The toothing of the grinding assembly is such as to further reduce the size of the granules originating from the rollers 7, 9.

Figure 4:
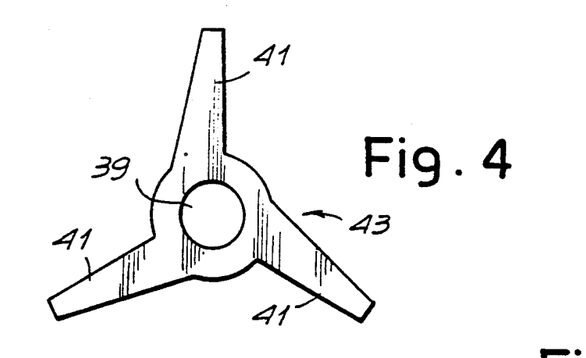
FIG. 4 shows a detail of the bladed rotor used to separate the metallic material from the nonmetallic material of the granules of greater size originating from the first screening assembly.
Figures 5, 7:
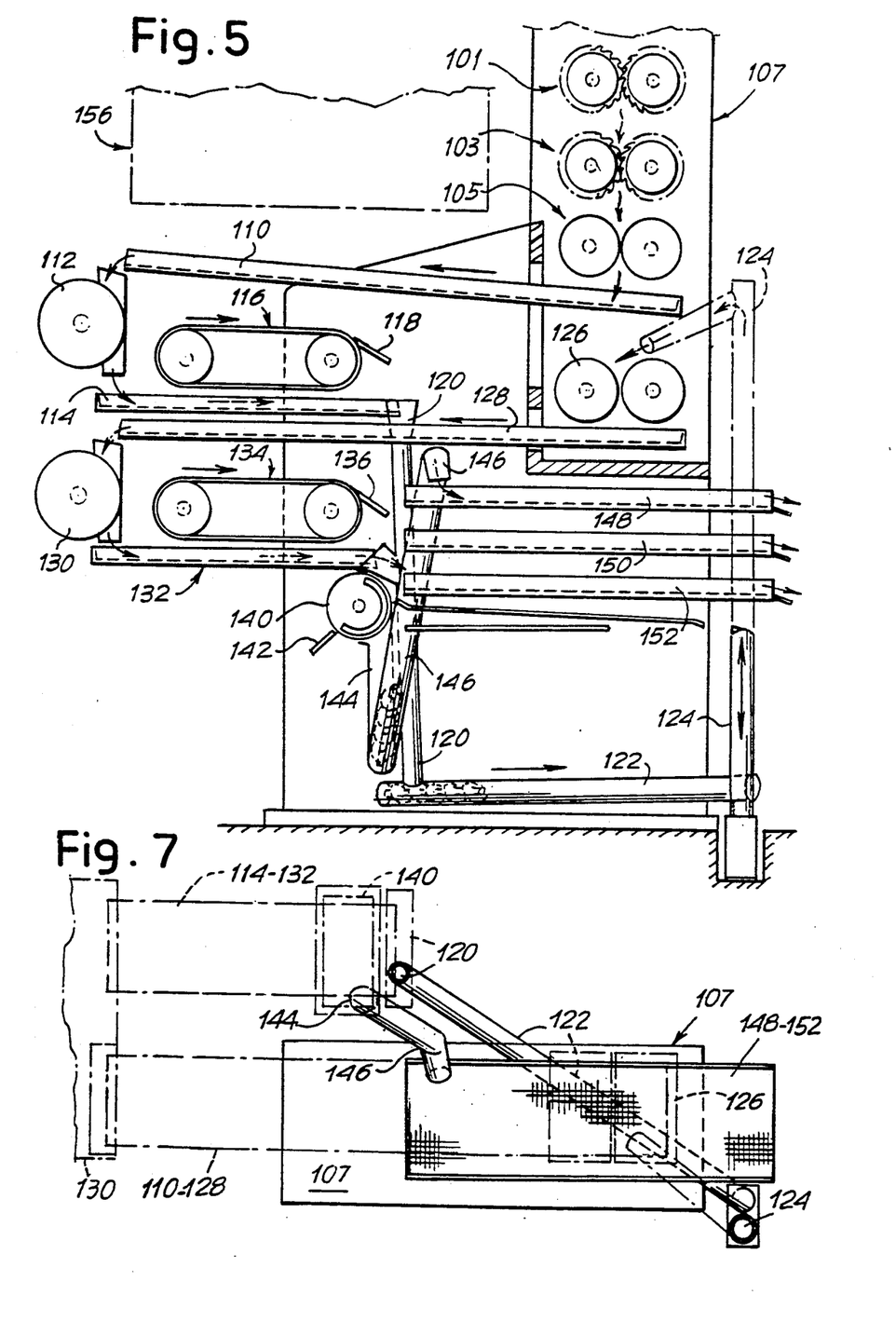
FIG. 5 shows a diagrammatic side view of the installation according to the invention.
FIG. 7 shows a plan view in even greater diagrammatic fashion.

The material ground and crushed by the crusher unit 1 falls in the direction of the arrow f2 toward a first screening assembly indicated as a whole by 27 and comprising a sieve 29 which effects a first separation of the granular material according to its size. In a possible embodiment, this sieve is a vibrating sieve having a 3 mm square mesh. The finer material is collected on a chute 31 whereas the coarser material is discharged in the direction f3 onto a chute 33 which conveys the material toward a station for separating or detaching the metallic material from the nonmetallic material, indicated as a whole by 35. The station 35 has a member 37 comprising a rotor having radial blades, the configuration of which is diagrammatically indicated in FIG. 4. The rotor is made up of a collection of blades mounted on an axle 39 and having cutting edges 41 radially arranged. In the example shown in the drawing, the edges 41 are at angles of 120° to each other. Further cutting edges, for example four arranged at 90°, can also be provided. The rotor, indicated as a whole by 43 in FIG. 4, is rotated at high speed (approximately 3,000–4,000 revolutions/minute) by means of an electric motor 45 and a pulley 47.

The granular material of greater size originating from the first screening assembly 27 enters the device 37 where it is subjected to the action of the radial blades 41 which, rotating at high speed, separate out the nonmetallic material, in this case rubber, from the metallic material (in particular iron) of the granules of greater size originating from the sieve 29. A granular product therefore emerges at the outlet 49 of the device 37, in which the metallic material is substantially separated from the nonmetallic material. Downstream from the outlet 49 the material is conveyed onto a separator means 51 comprising a flexible member 53 running around two pulleys 55 and 57. The second pulley 57 is magnetized so as to separate the ferromagnetic material, which is discharged in the direction of the arrow f4, from the nonferromagnetic material which is discharged in the direction f5. A collection means, for example a conveyor belt 59, is arranged at the outlet of the ferromagnetic material whereas a means for recirculating the material, for example a screw or a cup-type lifting device, indicated as a whole by 61, is arranged at the outlet of the nonmetallic material.

Downstream from the first screening assembly 27 is arranged a further means for separating the metal parts from the nonmetal parts, indicated as a whole by 63 and, similarly to the means 51, made up of a pair of pulleys 65, 67 around which runs a belt 68. The pulley 67 is magnetized so that the ferromagnetic parts are discharged in the direction of the arrow f6 onto the chute 33. The nonferromagnetic parts are discharged in the direction f7 onto a conveyor belt 69 which conveys these particles toward a second crusher unit 71. The second crusher unit 71 is made up of a pair of grinding rolls 73, 75 together with a cylinder 77 above these. Equivalent to the grinding rolls 19, 21 and to the cylinder 25 of the crusher unit 1, but having finer toothings so as to further reduce the size of the granules.

Arranged downstream from the second crusher unit 71 is a conveyor belt 81 which conveys all the material subjected to the second crushing operation to a separator means 83 made up of a partially magnetized roller which discharges the nonferromagnetic material in the direction of the arrow f8 toward a second screening assembly 85, and the ferromagnetic material in the direction of the arrow f9 onto a chute 87 which conveys the metallic material toward the conveyor belt 59.

The second screening assembly 85 comprises three vibrating sieves in series, indicated by 89, 91 and 93 respectively, and of decreasing mesh aperture. Associated with each sieve are means for collecting and discharging the screened material indicated by 95, 96, 97 and 98 respectively.

Operation of the installation may be summarized as follows: the material to be processed, originating from a shearing machine (not shown), is first crushed in the crusher unit 1. The granular material obtained is subjected to the first screening in the screening assembly 27, at the outlet of which the material of larger size is conveyed into the device 37 which separates the rubber from the iron in the larger granules. At the outlet of the device 37, the ferrous metal removing device 51 magnetically separates the ferrous material which is discharged onto the conveyor 59, from the nonferrous material which is discharged toward the cup lifting device 61 so that it can be reintroduced into the cycle. The granular material of smaller size, and in particular that having a diameter of less than 3 mm, is discharged onto the ferrous metal removing device 63 which conveys the metallic material toward the device 37 in order that said material advances along the path toward the conveyor belt 59, and the nonferrous material toward the conveyor 69. As can be diagrammatically seen in FIG. 1. The nonmetallic material originating from the ferrous metal removing apparatus 51 is also discharged onto the conveyor 69 and made to recirculate via the cup lifting device 61.

Therefore, all the material originating from the first screening assembly 27, and whose iron content is not sufficiently high to guarantee that separation will be carried out by the ferrous metal removing apparatuses 63 and 51 respectively, is conveyed onto the conveyor belt 69. This material conveyed by the conveyor belt 69 is discharged into the second crusher unit 71, at the outlet of which the ferrous metal removing apparatus 83 carries out a final separation of the ferromagnetic parts—which are discharged onto the chute 87—from the nonferromagnetic parts. The latter are sieved and graded by the screening assembly 85 so that on the discharge means 95, 96, 97, 98 fractions are collected of nonferromagnetic granular material of varying size, to then be reutilized as recovered product.

As illustrated in the enclosed FIGS. 5-12, 101, 103, 105 indicate three pairs of blade and grinding rollers of a first crusher complex, indicated as a whole by 107, to grind the sheared pieces of tire which are gravity-fed to the assembly 107. Each pair of blade rollers has a plurality of toothed disks similar to those already illustrated with reference to assembly 1 of FIG. 1. The disks of the two rollers of each pair have different rotational and peripheral speeds respectively so as to produce the shearing action, and the subsequent pairs of rollers generate a gradually increasing crushing action on the tire pieces. The material crushed in this way is collected by a first conveyor 110 which feeds the material to a first crusher 112. Advantageously, the conveyor 110 (as well as the other conveyors described below) is of the oscillating type and is therefore able to impart to individual particles upward (micro-projection) and forward trajectories, and projection relative to the jerky and undulatory motion imparted to the surface structure of the conveyor, so that the individual particles may also be moved upward. The material from the conveyor 110 reaches the first crusher 112 to the side of the latter. This crusher has already been partly defined with reference to the embodiment of FIG. 1.

Figure 6:
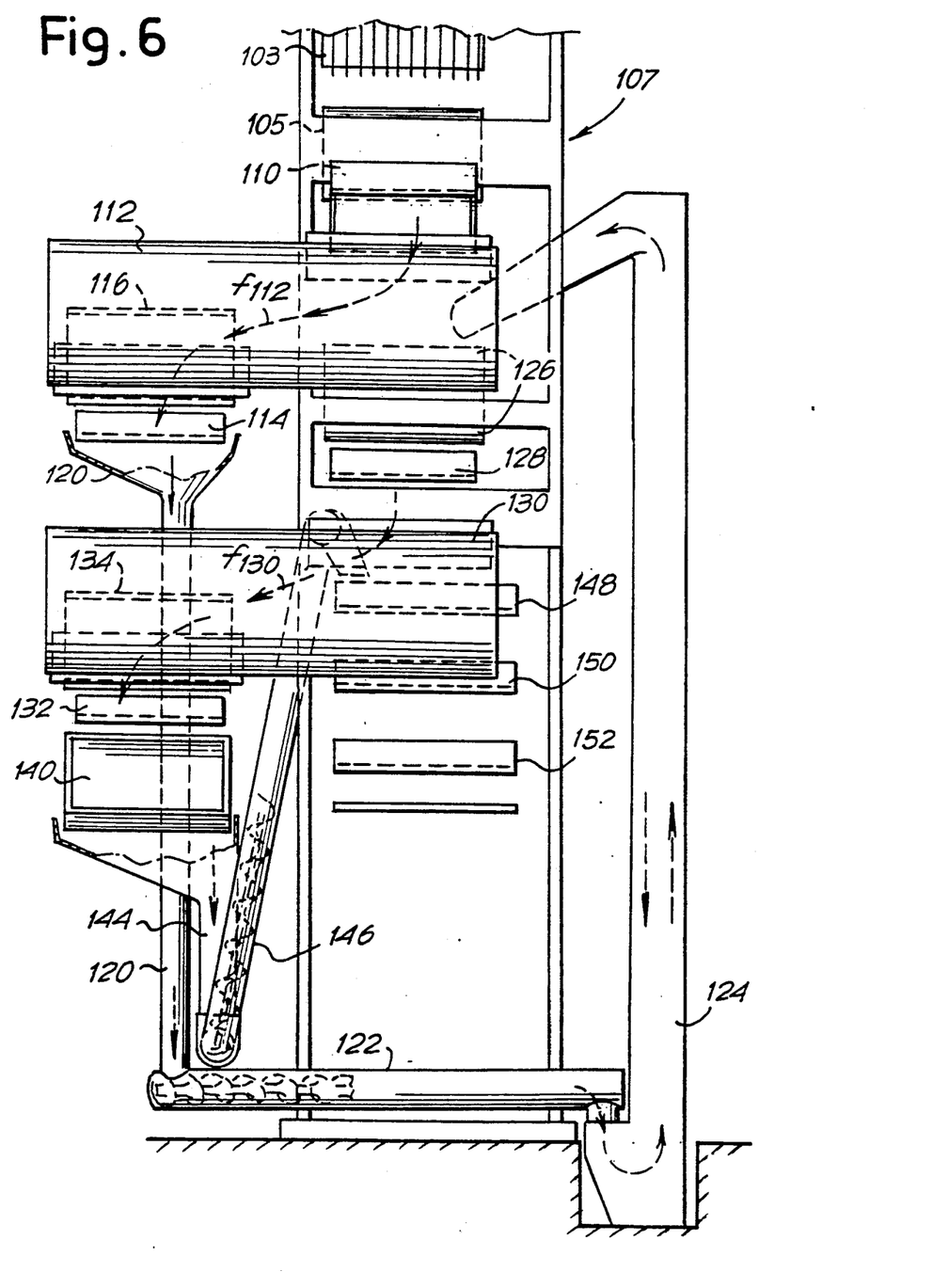
FIG. 6 shows an end view thereof.

The crusher 112 is a crusher having radial blades formed by star-shaped tools mounted on a central shaft of the rotor, the blades being arranged in a substantially helical pattern so that, in addition to the material's being crushed, it is also made to advance in an axial direction as shown by the arrows f112 in FIG. 6, whereby the crushed material in the crusher 112 may be collected in a second conveyor 114. A first magnetic separator or ferrous metal removing apparatus 116 which is located above the conveyor 114 and is provided with a continuous band which is made to pass very closely over the conveyor 114 so as to draw up the ferromagnetic particles present in the conveyed material. The ferromagnetic material—in particular free iron or steel particles or those carrying only very small adhering particles of rubber—is discharged from the ferrous metal removing apparatus 116 as indicated by the line 118 by a shaving implement or other means. The residual material conveyed by the conveyor 114 is made to drop into a tubular column 120 whereby it reaches a horizontal transport means 122 having a horizontal screw, which extends through the lower section of the installation up to a lifting device 124. This being of the screw-, cup-, or similar type and arranged to the side of the unit. From the lifting device 124 the material is fed to a further grinding stage 126, similar to the grinding stages of the assembly 107. From the subsequent grinding stage 126, a conveyor 128 similar to the previous ones, transfers the material to a second crusher 130 which, similarly to the crusher 112, is also of the blade type. In the crusher 130, the material follows a substantially axial path to then be discharged into a screen 132. On its path and processing through this screen 132, the material is subjected to the action of a second ferrous metal removing apparatus 134 similar to the one 116 and located above the screen 132. The second ferrous metal removing apparatus 134 separates out other ferrous particles which are conveyed along a line 136 to join the ferrous material obtained from the line 118 originating from the ferrous metal removing apparatus 116. The material retained by the screen 132 is discharged via a coarse line 138 (FIG. 12) into the horizontal screw conveyor 122 and is also optionally introduced into a tubular drop column 120. The material which has passed through the screen 132 is discharged onto a third ferrous metal removing apparatus 140, in which the ferrous material which is separated out is conveyed along 142 to be recovered together with the material originating from the ferrous metal removing apparatuses 116 and 134 along the paths 118 and 136. The nonferrous material discharged from the ferrous metal removing apparatus 140 is fed along a path 144 to an inclined screw 146 to be lifted upward. From the lifting screw 146 the material is fed to the first screen 148 of a series of screens 148, 150 and 152 which operate in a cascade arrangement so as to carry away the granules which are in decreasingly smaller pieces by corresponding outlets indicated as a whole by 154.

Figure 8:
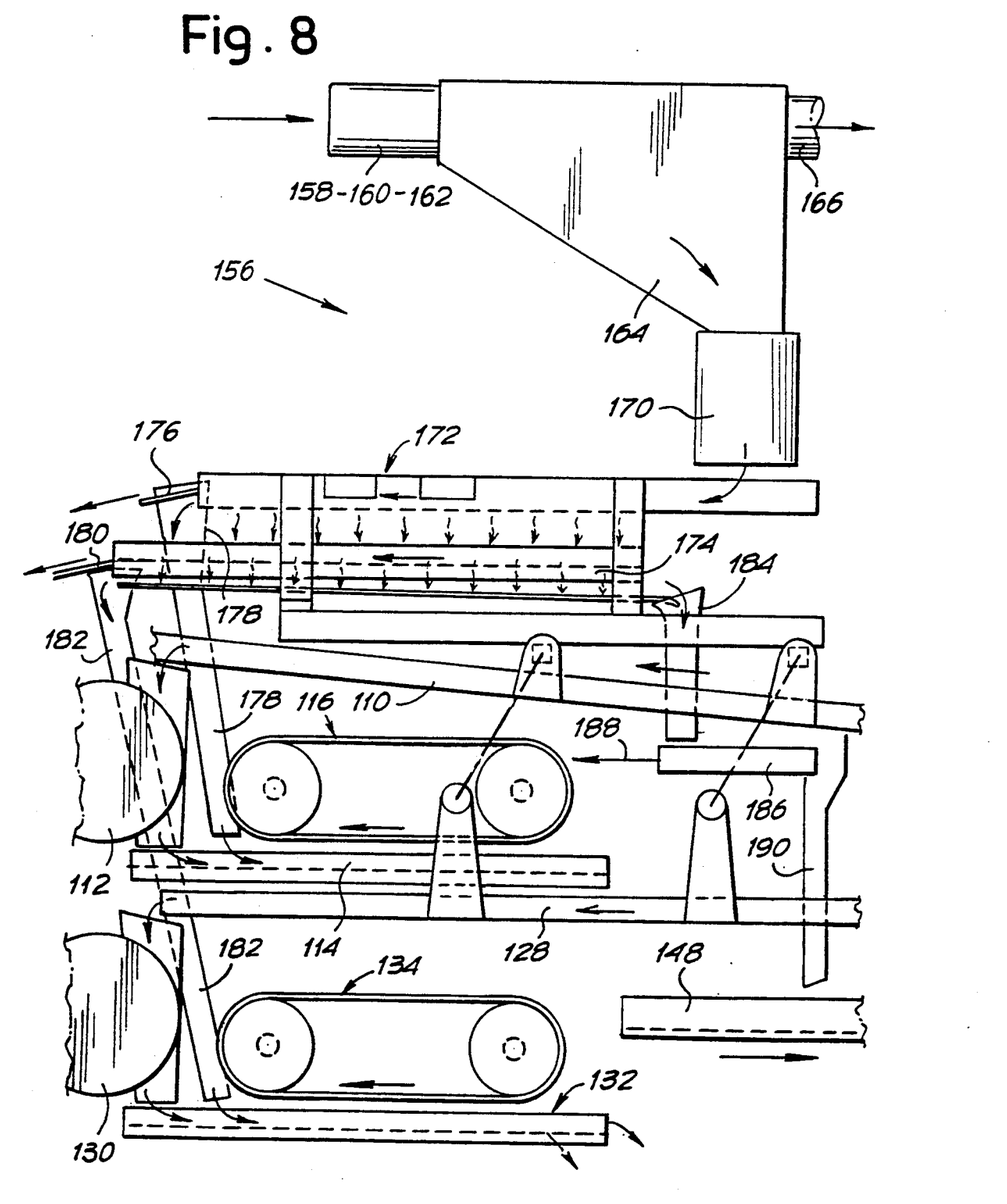
FIG. 8 shows a diagram of the devices associated with the suction means.

Associated with the installation described is a suction unit 156 which draws up the particles from the first crusher 112, from the second crusher 130 and also from the inclined lifting screw 146 along conduits 158, 160 and 162 respectively, using pneumatic vacuum conveying means. Both very small particles of rubber material and mainly synthetic fiber material arising from the presence of the polyester plies are drawn along these conduits. The material pneumatically collected in this way is directed toward a separating trap-mechanism having a chamber in which the flow decelerates and where separation of the particles from the air conveying them occurs as a result of gravity. Via a conduit 166, the air reaches a filtering assembly 168 which comprises cloth sleeves or the like to ensure that any residual particles are retained. The particles separated in the chamber 164 of the trap mechanism are delivered via a star-shaped valve 170 to the first of two separator and conveyor units, indicated as a whole by 172 and 174, of substantially identical structure and which will be described below. Elements 172 and 174 separate the fibers from the particles of varying particle size. In particular the first device 172 separates out tufts of fibers at 176 and large rubber particles at 178 which are then directed to the conveyor 114 to be directed to the first ferrous metal removing apparatus 116. The particles which have passed through the screen 172 reach the second unit 174 which is similar to the previous one and separates out fiber tufts at 180. The material retained by the screen being conveyed along the line 182 to the screen 132. The material passing through the screen of the unit 174 follows a line 184 to a further separator 186 which separates out further tufts of fiber at 188 whereas the comparatively very fine granular material continues along the line 190 to reach the first screen 148 for a further, final screening. The tufts of fibers from the outlets 176, 180 and 188 may be combined so as to reutilize said fibers.

Figures 9, 10:
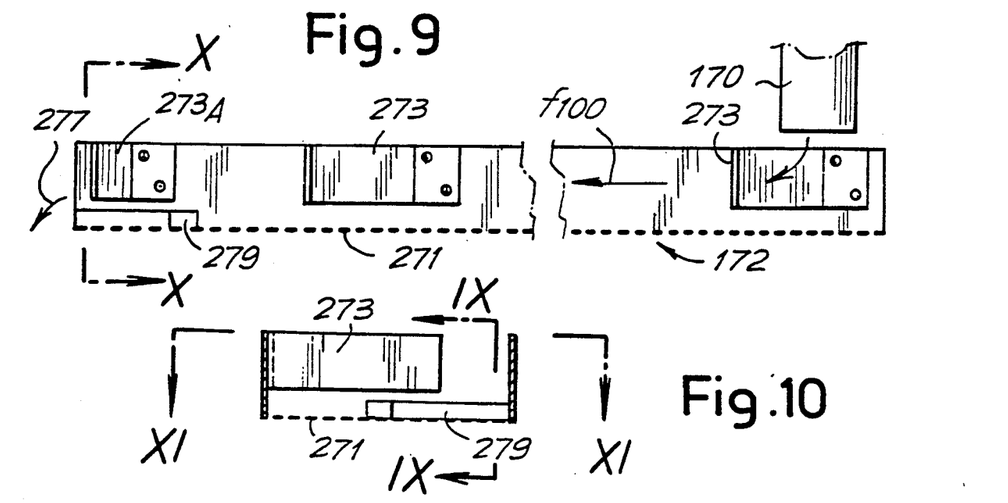
FIGS. 9, 10 and 11 show an oscillating conveyor system for separating the granules from the fibers, according to a cross section along IX—IX of FIG. 10, according to a cross section along X—X of FIG. 9, and according to a plan view along XI—XI of FIG. 10, respectively.
Figure 11:
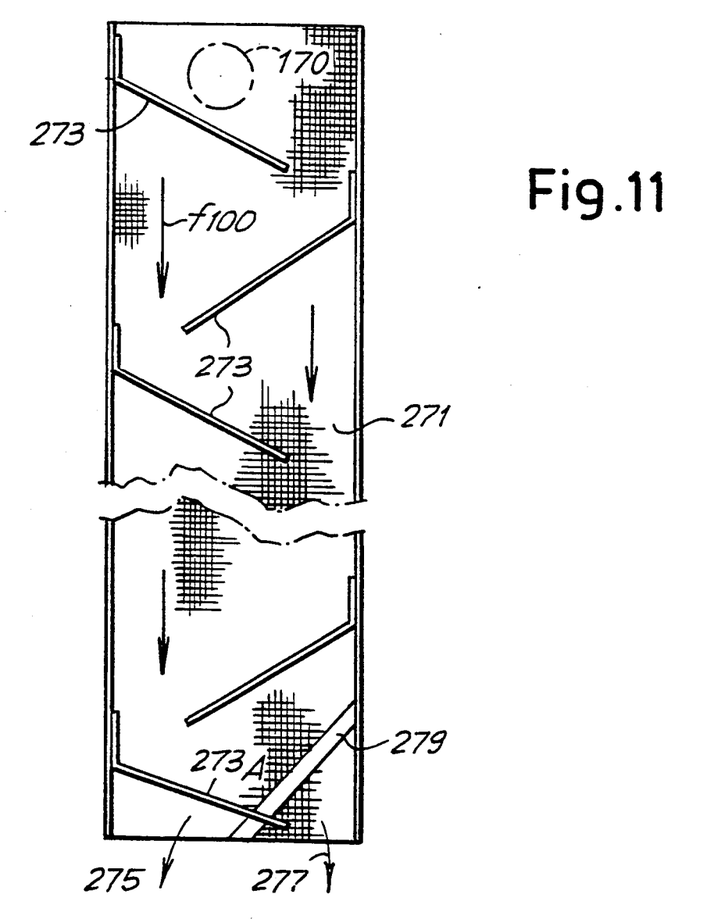
Figure 12:
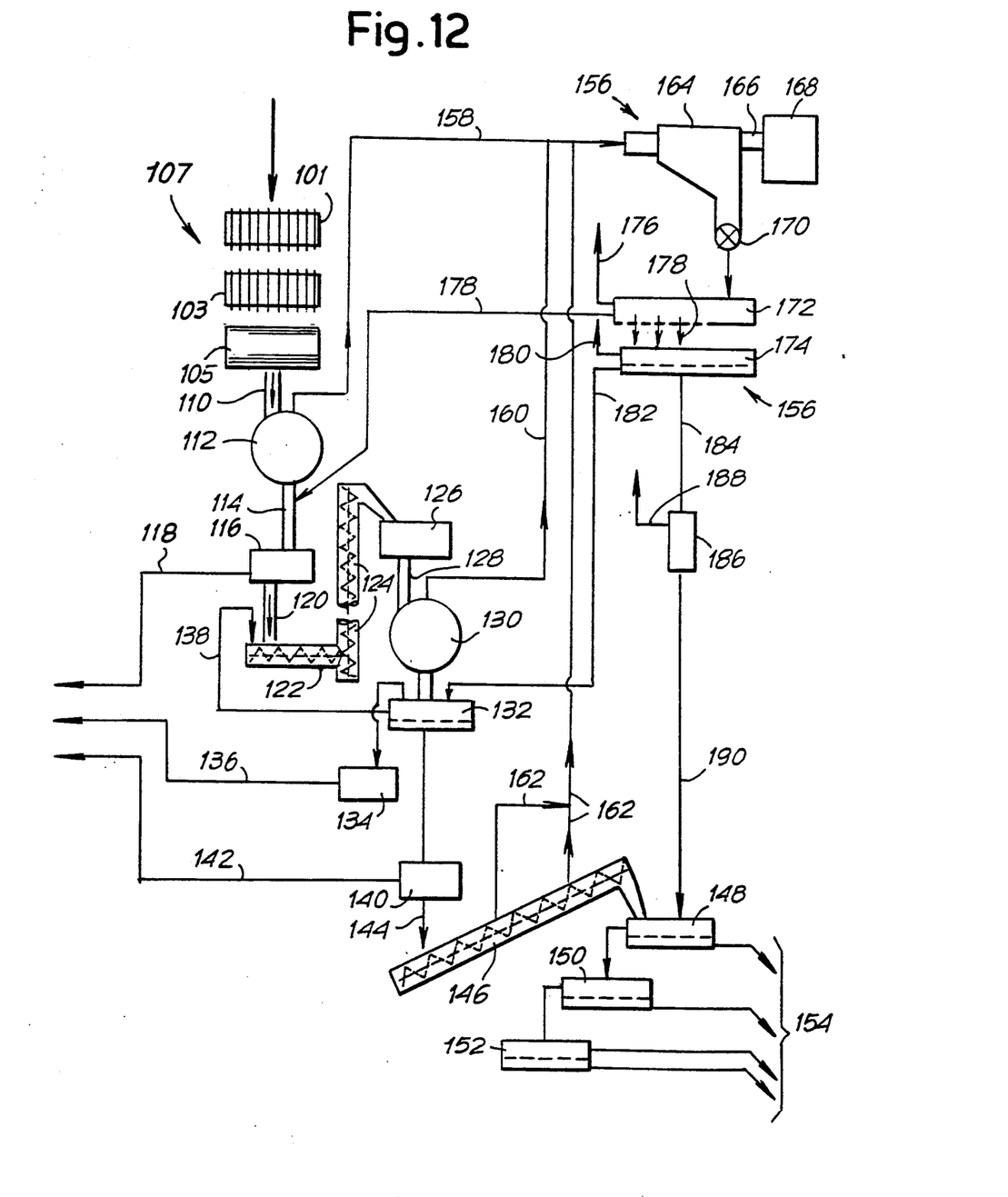
FIG. 12 shows an explanatory diagram.

Each of the units 172 and 174 is more clearly illustrated in FIGS. 9, 10 and 11. With reference to the unit 172, this receives the material separated out in the trap mechanism 164 via the star-shaped valve 170. The separator conveyor comprises a channel with a screen-base 271 and with a series of small blades 273 oriented in a zigzag pattern off the sides of the channel and raised above the base of the channel 271 to a limited degree for purposes which will be indicated below. The channel ends have an outlet 275 on one side and another outlet 277 on the other side, in proximity to a directional element 279 attached to the base 271. The material received in the channel of the unit 172 comprises rubber particles and polyester fibers. An oscillating conveyor system sets the screening channel 271 in motion. The granules fed in are conveyed in microjumps in the rectilinear direction f100 toward the outlet 275 passing beneath the blades 273. During the microjumps the heavier rubber granules tend to become concentrated in a bottom layer and therefore pass beneath the blades 273, whereas the polyester ply fibers mixed in with the rubber granules, being lighter, become concentrated on the surface of the granular flow. By continuing with the microjumps, the surface fibers tend to combine together to form "tufts" of approximately 15–30 mm in diameter. As a result of their size and their lightness the "tufts" are guided by the blades 273 which force them to follow a zigzag path which encourages deformation of the tufts and forces them to exit through a side outlet. So as to divide the two products through two different outlets, the directional element 279 is provided on the final section of the channel and has an inclination opposite to that of the last blade 273A and is of a height which does not interfere with the advance of the tufts, but directs the rubber granules toward the outlet 275, that is to the line 178. The tufts of fibers from the blade 273A are instead directed toward the outlet 277, that is to the line or fiber collector 176. The material which has passed through the screen-base 271 reaches the second unit 174 which is similar to the previous unit and has outlets 180, 182 and 184 as described above.

It will be understood that the drawing merely shows an illustrative embodiment which is given purely as a practical demonstration of the invention, it being possible to vary said invention as regards shapes and arrangements without thereby departing from the scope of the concept underlying said invention. The presence of any reference numerals in the accompanying claims has the purpose of facilitating reading of the claims with reference to the description and to the drawing and does not limit the scope of protection represented by the claims.

I claim:

1. An apparatus for crushing vehicle tires and separating metal parts from nonmetal parts, the apparatus comprising:

first crusher means for receiving pieces of the vehicle tires, reducing a size of the pieces, and then dropping the reduced pieces;

a first conveyor belt positioned under said first crusher means, said first conveyor belt including a sieve, said first conveyor belt moving the reduced pieces in a first direction from under said first crusher means, across said sieve and toward an end of said first conveyor belt;

a fine receiving chute positioned below said sieve and guiding fine pieces falling through said sieve in substantially said first direction from a first end to a second end of said fine receiving chute, said second end of said fine receiving chute being adjacent said end of said first conveyor belt;

a coarse receiving chute having a first end positioned at and under said end of said first conveyor belt, said coarse receiving chute guiding coarse pieces from said first conveyor belt downward and substantially opposite to said first direction toward a second end of said coarse receiving chute;

first magnetic separator means positioned below said end of said fine receiving chute and above said coarse receiving chute, said first magnetic separator means receiving the fine pieces from said end of said fine receiving chute and separating magnetic pieces from non-magnetic pieces, said first magnetic separator means dropping the magnetic pieces onto said coarse receiving chute;

a second conveyor belt having a first end positioned below said first magnetic separator means and above said coarse receiving chute, said first magnetic separator means dropping the non-magnetic pieces onto said second conveyor belt, said second conveyor belt moving the non-magnetic pieces in a direction substantially opposite to said first direction and to a second end of said second conveyor belt;

detachment means positioned at and below said second end of said coarse receiving chute, said detachment means receiving the magnetic parts from said coarse receiving chute and for detaching metallic parts of the magnetic material from non-metallic parts;

second magnetic separator means positioned below said detachment means and for receiving the detached metallic and non-metallic parts from said detachment means, said second magnetic separator means guiding magnetic pieces into a metal conveyor belt;

vertical collection means for receiving non-magnetic parts from said second magnetic separator, transporting the non-magnetic parts substantially vertically and then depositing the non-magnetic parts on said second conveyor belt;

second crusher means positioned under said second end of said second conveyor and for receiving the non-magnetic parts moved by the second conveyor, said second crusher means reducing a size of the non-magnetic parts and then dropping the reduced parts;

a third conveyor belt positioned under said second crusher means, said third conveyor belt moving the reduced parts in substantially said first direction toward an end of said third conveyor belt;

third magnetic separator means positioned below said end of said third conveyor belt and for receiving the reduced parts from said third conveyor belt, said third magnetic separator means guiding magnetic pieces into a metal chute leading to the metal conveyor belt; and screening means for receiving non-magnetic parts from said third magnetic separation means and separating the non-magnetic parts into three different sizes.

2. An apparatus in accordance with claim 1, wherein: said detachment means includes a rotor including a plurality of radial blades having radial cutting edges and rotating at an angular speed between 3,000 and 4,000 rpm.

3. An apparatus in accordance with claim 2, wherein: said rotor includes 3 blades angularly spaced substantially 120 degrees apart.

4. An apparatus in accordance with claim 1, wherein: said fine receiving chute is slanted downwards from said first end to said second end of said fine receiving chute; and said second conveyor belt is slanted downward from said first end to said second end of said second conveyor belt.

5. An apparatus for crushing vehicle tires and separating metal parts from nonmetal parts, the apparatus comprising:

first crusher means for receiving pieces of the vehicle tires, reducing a size of the pieces, and then dropping the reduced pieces;

a first conveyor belt positioned under said first crusher means, said first conveyor moving the reduced pieces in a first direction from under said first crusher means and toward an end of said first conveyor belt;

second crusher means positioned under said end of said first conveyor belt and for receiving the reduced pieces moved by the first conveyor, said second crusher means further reducing a size of the reduced pieces and then dropping the further reduced pieces;

a second conveyor belt having a first end positioned below said second crusher means, said second crusher means dropping the further reduced pieces onto said second conveyor belt, said second conveyor belt moving the further reduced pieces in a direction substantially opposite to said first direction and to a second end of said second conveyor belt;

first magnetic separator means positioned above said second conveyor belt and for removing magnetic pieces from the further reduced pieces, said first magnetic separator means dropping the magnetic pieces into a metal receiving line;

a substantially vertical tubular column having a first end positioned under said second end of said second conveyor and receiving non-magnetic pieces from said second conveyor, said substantially vertical column having a second end below said first end;

substantially horizontal transport means having a first end connected to said second end of said substantially vertical tubular column and including a horizontal screw, said substantially horizontal transport means moving the non-magnetic pieces in a substantially substantially horizontal direction substantially opposite to said first direction and to a second end of said substantially horizontal transport means;

lifting means lifting the non-magnetic pieces from said second end of said substantially horizontal transport means and discharging the lifted pieces from an upper end of said lifting means;

third crusher means positioned under said upper end of said lifting means and for receiving and reducing a size of the lifted pieces and then dropping the reduced pieces;

a third conveyor belt having a first end positioned below said third crusher means, and moving the reduced pieces in a direction substantially parallel to said first direction and to a second end of said second conveyor belt;

fourth crusher means positioned under said second end of said third conveyor belt and for receiving the reduced pieces moved by the third conveyor, said fourth crusher means further reducing a size of the reduced pieces and then dropping the further reduced pieces;

a screen conveyor belt having a first end positioned below said fourth crusher means, and moving the further reduced pieces in a direction substantially opposite to said first direction and to a second end of said second conveyor belt;

second magnetic separator means positioned above said screen conveyor belt and for removing magnetic pieces from the further reduced pieces, said second magnetic separator means dropping the magnetic pieces into said metal receiving line;

a coarse line positioned at said second end of screen conveyor and receiving coarse pieces from a top of said screen conveyor, said coarse line delivering said coarse pieces to said substantially vertical tubular column;

third magnetic separator means positioned below said end second of said screen conveyor belt and for receiving fine parts from below said screen conveyor belt, said third magnetic separator means guiding magnetic pieces to said metal receiving line; and screening means for receiving non-magnetic parts from said third magnetic separation means and separating the non-magnetic parts into three different sizes.

6. An apparatus in accordance with claim 5, wherein:
said second and fourth crusher means includes radial blades formed by star-shaped tools mounted on a central shaft, said blades positioned in a substantially helical pattern to axially move the pieces substantially transverse to said first direction.

7. An apparatus in accordance with claim 5, further comprising:

suction means for drawing light small particle from said second crusher means, said fourth crusher means and said screening means, said suction means including a trap means for removing the light small particles from an airstream;

first conveyor separator means for receiving the light small particles from said trap means, said first conveyor separating means including a screen base and an oscillating means for oscillating said screen base to cause coarse rubber particles to concentrate on top of said screen base and to cause loose fibers to concentrate above the coarse rubber particles, said first conveyor separator means also including a plurality of blades raised above said screen base and guiding the loose fibers to sides of said screen base, said first conveyor separator means also including a direction element cooperating with one of said blades to move the coarse rubber particles to said second conveyor belt and the loose fibers to a fiber collector; and second conveyor separator means for receiving the fine particles from said first conveyor separator means, said second conveyor separating means including a screen base and an oscillating means for oscillating said screen base to cause coarse rubber particles to concentrate on top of said screen base and to cause loose fibers to concentrate above the coarse rubber particles, said second conveyor separator means also including a plurality of blades raised above said screen base and guiding the loose fibers to sides of said screen base, said second conveyor separator means also including a direction element cooperating with one of said blades to move the coarse rubber particles to said fourth conveyor belt and the loose fibers to a fiber collector, fine particle falling through said screen base being lead to said screening means.

8. A method for crushing vehicle tires and separating metal parts from nonmetal parts, the method comprising the steps of:

grinding pieces of the vehicle tires;

crushing the ground pieces;

magneticly separating the crushed pieces into magnetic pieces and non-magnetic pieces;

further grinding the non-magnetic pieces;

further crushing the further ground pieces;

magneticly separating the further crushed pieces into magnetic pieces and non-magnetic pieces;

separating the non-magnetic pieces into fine size pieces and coarse size pieces;

magneticly separating the fine size pieces into magnetic pieces and non-magnetic pieces; and sorting the non-magnetic pieces into three different sizes.

* * * * *